E. B. GALBREATH.
INTERNAL COMBUSTION ENGINE.
APPLICATION FILED JUNE 10, 1918.

1,307,045.

Patented June 17, 1919.
3 SHEETS—SHEET 1.

Witness
Frank A. Fahle

Inventor
Edwin B. Galbreath,

Attorneys

E. B. GALBREATH.
INTERNAL COMBUSTION ENGINE.
APPLICATION FILED JUNE 10, 1919.

1,307,045.

Patented June 17, 1919.
3 SHEETS—SHEET 2.

Witness
Frank A. Fahle

Inventor
Edwin B. Galbreath,
Hood & Schley
Attorneys

E. B. GALBREATH.
INTERNAL COMBUSTION ENGINE.
APPLICATION FILED JUNE 10, 1918.

1,307,045.

Patented June 17, 1919.
3 SHEETS—SHEET 3.

Witness
Frank A. Fable

Inventor
Edwin B. Galbreath,
By
Hood & Ashley.
Attorneys

UNITED STATES PATENT OFFICE.

EDWIN B. GALBREATH, OF INDIANAPOLIS, INDIANA.

INTERNAL-COMBUSTION ENGINE.

1,307,045.   Specification of Letters Patent.   Patented June 17, 1919.

Application filed June 10, 1918.   Serial No. 239,091.

*To all whom it may concern:*

Be it known that I, EDWIN B. GALBREATH, a citizen of the United States, residing at Indianapolis, in the county of Marion and State of Indiana, have invented a new and useful Internal-Combustion Engine, of which the following is a specification.

It is the object of my invention to provide a novel internal combustion engine, which utilizes the expansion of the exploding gases more fully, which has a power stroke in each power cylinder for each movement of the piston in one direction, which has its cylinders mounted as parts of a rotor so that by their movement a sufficient current of air is created to produce efficient cooling, and in which the initial combustion for all the cylinders occurs at a single place, where alone a spark plug or other igniting device need be provided.

Figure 1:
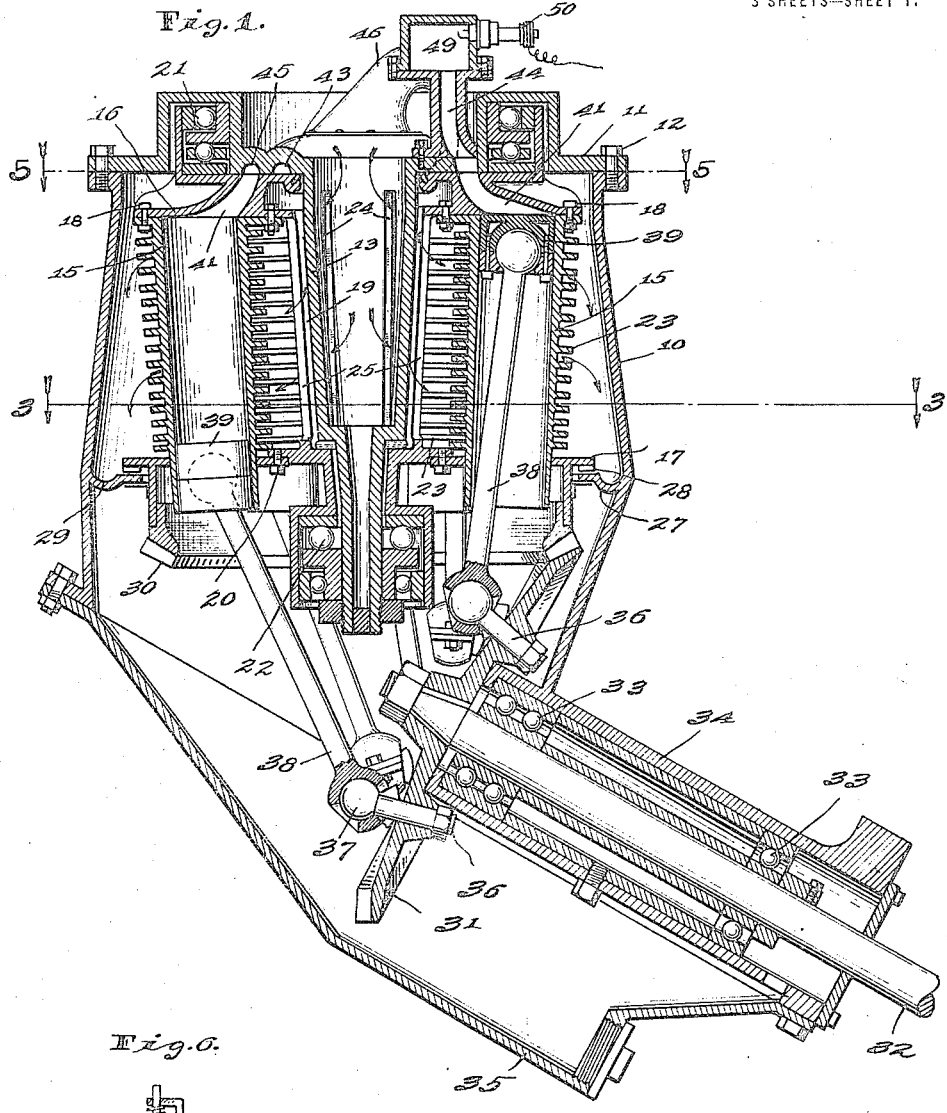
Figure 6:
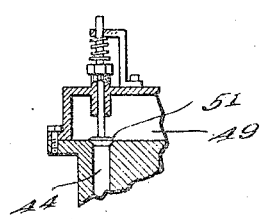
Figure 2:
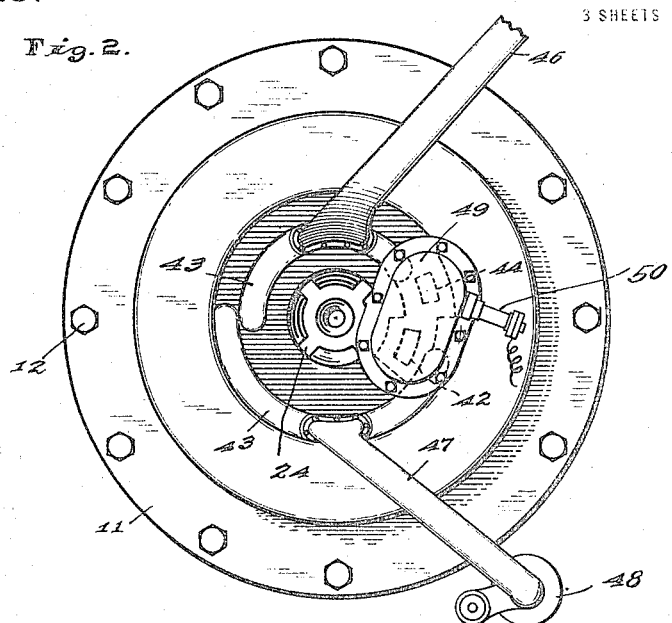
Figure 3:
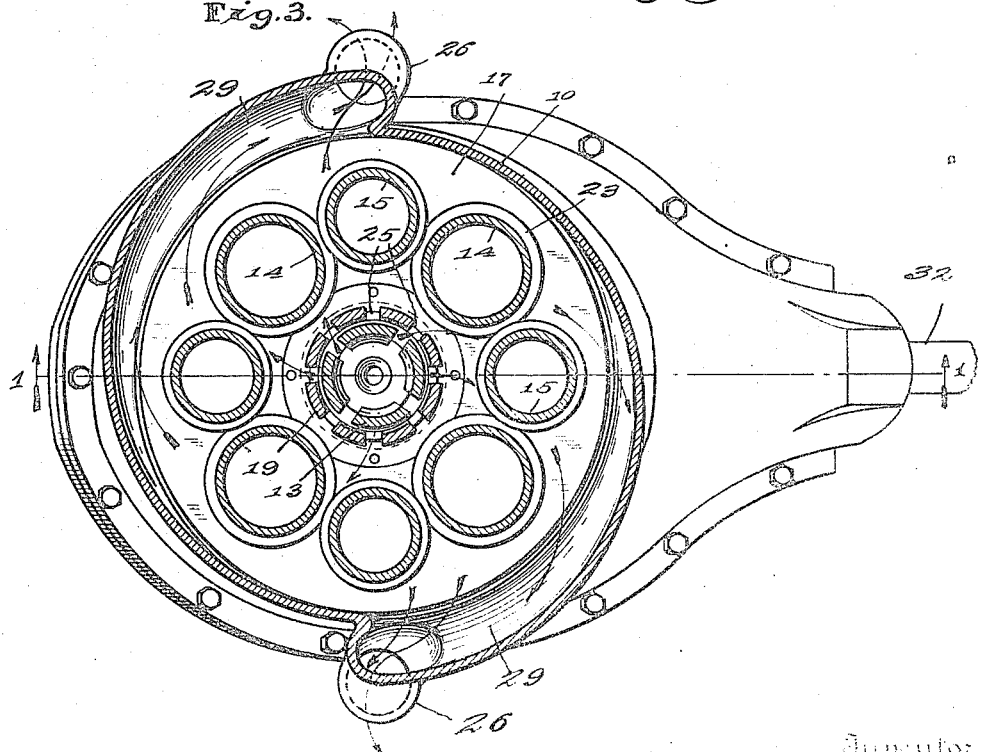
Figure 4:
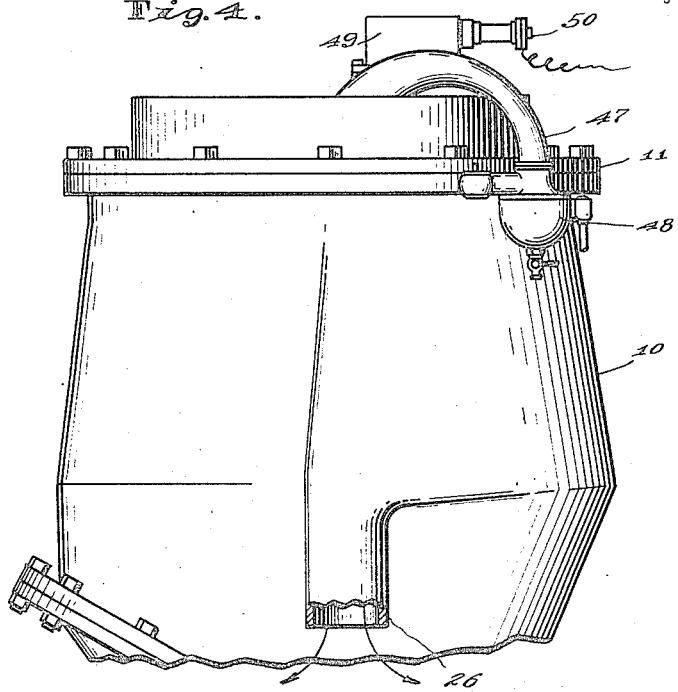
Figure 5:
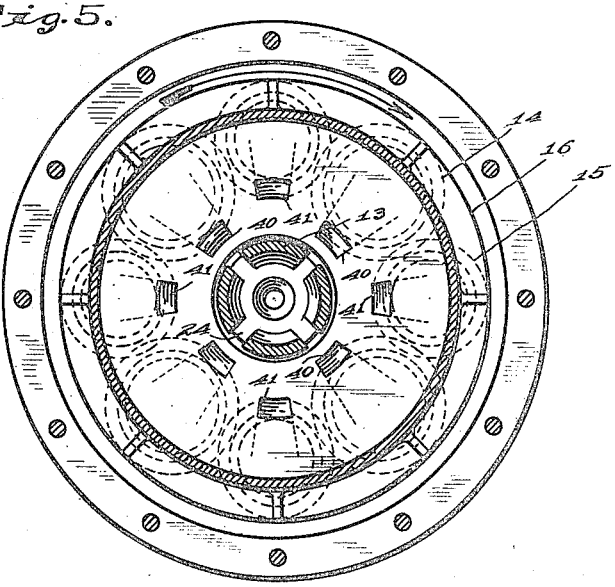

The accompanying drawings illustrate my invention. Figure 1 is a vertical central section, on the line 1—1 of Fig. 3, through an internal combustion engine embodying my invention; Fig. 2 is a plan of such engine; Fig. 3 is a section on the line 3—3 of Fig. 1; Fig. 4 is an elevation of the upper portion of such engine; Fig. 5 is a section on the line 5—5 of Fig. 1; and Fig. 6 is a fragmentary view showing the inlet valve from the compression cylinders to the firing chamber.

The engine stator comprises an outer shell 10, and a cover plate 11, fastened together by bolts 12. From the center of the cover plate 11 a central hollow stem 13, open at the top, projects downward well into the casing 10.

The rotor consists of an annular series of alternating power cylinders 14 and compression cylinders 15, mounted between a common head plate 16 and a bottom plate 17. The cylinders are bolted to the head plate 16, by bolts 18, but project through suitable holes in the bottom plate 17, as is clear from Fig. 1, so as to allow for relative movement between the cylinders and the rotor frame 19 with which the head plate 16 is preferably integral. The bottom plate 17 is preferably separable from the rotor frame 19, and is attached thereto by bolts 20, to facilitate assembly.

The rotor frame 19 is carried by suitable bearings 21 between its upper end and the cover plate 11 and suitable bearings 22 between its lower end and the lower end of the stem 13, these bearings being arranged to take thrusts both axially and radially. The cylinders 14 and 15 preferably have their lower ends closer to the axis of the rotor than are their upper ends, so that the cylinders slant downwardly and inwardly toward the rotor axis, as is clear from Fig. 1. The cylinders are provided with fins 23, for promoting heat radiation, and the fins of the power cylinders conveniently overlap the fins of the compression cylinders, as is clear from Figs. 3 and 5. The hollow stem 13 of the stator is provided with longitudinal slots 24, and the frame 19 of the rotor, which is spaced from the stem 13, is provided with smaller slots 25, there preferably being a greater number of slots 25 than of slots 24, as is clear from Fig. 3. Thus when the rotor rotates, air is drawn in through the open upper end of the stem 13 and radially outward through the slots 24 and 25 and through the spaces between the fins 23 of the cylinders, thus cooling the cylinders. This movement of the air is caused by the centrifugal force created by the movement of the cylinders about the axis of the rotor. The air thus thrown outward between the cylinders strikes the inside of the casing 10, the casing preferably being shaped so that its two halves in horizontal cross section form parts of spirals, as is clear from Fig. 3, of increasing radius in the direction of rotor rotation, whereby the outwardly thrown air is conducted toward the large ends of the spiral spaces and there led into downwardly extending air-discharge pipes 26. Preferably a shelf 27 projects inward from the casing 10 just below the overhanging outer edge of the bottom plate 17, on the under face of which there are preferably radial fingers 28 extending in proximity to the upper face of the flange 27, and on the upper side of the flange 27 are provided grooves 29 which catch the dust and convey it under the influence of the air movement toward the discharge pipes 26.

A bevel gear 30 is mounted on the bottom plate 17 below the lower ends of the cylinders, and this bevel gear meshes with a bevel gear 31 mounted on the end of a transmission shaft 32 supported on suitable bearings 33 carried in a sleeve 34 conveniently formed integral with the lower part of the casing 10 but at an oblique angle to the axis of the rotor. A suitable oil pan 35 is provided to close the lower end of the casing 10 and to extend below the sleeve 34. Ordinarily in operation the transmission shaft 32 is as nearly horizontal as convenient, though this is not essential, since it is merely a convenient way of mounting the engine on an automobile.

An annular series of pins 36 having ball heads 37 mounted on the bevel gear 31, the angular spacing of alternate pins corresponding to the angular spacing between adjacent cylinders. 14 or 15. Connecting rods 38 connect these ball-headed pins 36 to pistons 39 in the cylinders 14 and 15, these connecting rods having universal joint connections of some sort, such as the ball and socket joints shown, with both the ball-headed pins 36 and the pistons 39. By this arrangement, as the rotor and the shaft 32 rotate about their respective axes, the pistons 39 reciprocate in their respective cylinders. The rotation is caused in normal operation by the expansive force of the burning gases above the pistons in the power cylinders 14, forcing such pistons downward, and transmitting the force from the pistons through the connecting rods 38 and the ball-headed pins 36 to the bevel gear 31, which is rotated to turn both the shaft 32 and the rotor.

The head plate 16 fits closely against the inside surface of the cover plate 11, so as to provide a substantially gas-tight joint. A passage 40 is provided through the head plate for each power cylinder 14 and a similar passage 41 for each compression cylinder 15, the passages 41 for two of the compression cylinders being shown in Fig. 1. Each passage 40 and 41 at its lower end covers the whole head of its associated cylinder. At their upper ends, the passages 40 are arranged in one annular series, at a definite distance from the axis of rotation of the rotor, and the passages 41 are arranged in another annular series at a greater distance from such axis of rotation, said passages 40 and 41 alternating angularly, all of which is apparent from Fig. 5. The paths of travel of the upper ends of the passages 40 and of the upper ends of the passages 41 are entirely separate, though concentric; that is, the inner edges of the upper ends of the passages 41 are at a greater distance from the axis of rotation of the rotor than are the outer edges of the upper ends of the passages 40.

The upper end of each passage 40 comes into registry with an opening 42 during the first portion of the down-stroke of the piston 39 in the associated power cylinder 14, and I believe it best that this registry should begin immediately after such piston has passed its upper dead center; and comes into registry with an arc-shaped opening 43 when such piston in the associated power cylinder is traveling upward, and I believe it is best that this arc-shaped passage 43 should extend from a point just before such piston is at its lower dead center to a point where such piston has nearly reached its upper dead center. The upper end of each passage 41 comes into registry with an opening 44 during the last portion of the up-stroke of the piston 39 in the associated compression cylinder 15, and I believe it best that this registry should terminate immediately before such piston reaches its upper dead center; and comes into registry with an arc-shaped opening 45 when such piston in the associated compression cylinder is traveling downward, and I believe it is best that this arc-shaped passage 45 should extend from a point just after such piston is at its upper dead center to a point where such piston has passed its lower dead center. This arrangement of the openings 42 and 44 and the arc-shaped passages 43 and 45 is apparent from Fig. 2. The arc-shaped passages 43 and 45 are formed in the under face of the cover plate 11, and communicate with an exhaust pipe 46 and an intake pipe 47 respectively, the receiving end of the intake pipe being associated with a suitable carbureter 48. The openings 42 and 44 communicate with a firing chamber 49, suitably mounted above the cover plate 11, as is clear from Figs. 1 and 2, and in this firing chamber is arranged a spark plug 50 or other suitable ignition devices, for the ignition for all the power cylinders takes place in this single firing chamber. If desired, a check valve 51 may be provided between the passage 44 and the firing chamber 49, for permitting flow of gases through such passage 44 to such firing chamber while preventing it in the reverse direction, as is clear from Fig. 6.

In operation, as the rotor and the transmission shaft 32 rotate, the passages 41 come successively into engagement with the arc-shaped passage 45 during the down-strokes of the pistons 39 of the associated compression cylinders 15; and such down-strokes create a suction which draws a charge of explosive mixture from the carbureter 48 through the intake pipe 47, arc-shaped passage 45, and the passages 41 in registry with such arc-shaped passage 45, into the compression cylinders 15 in which the piston 39 are moving downward. As each of these pistons reaches the end of its down-stroke, the associated passage 41 passes out of registry with the arc-shaped passage 45, thus completing the suction stroke; and as the rotation continues this piston 39 in a compression cylinder is forced upward to compress the charge which has been drawn into such cylinders. As each piston 39 in a compression cylinder 15 nears the upper end of its stroke, the associated passage 41 comes into registry with the passage 44, permitting the compressed charge in such compression cylinder to be expelled by the upwardly moving piston from such cylinder through the passages 41 and 44 and past the check valve 51 (if it is provided) into the firing chamber 49.

Here the charge is ignited by a spark from the spark plug 50, and the burning charge passes downward through the passage 42 into one of the power cylinders 14—the power cylinder next in advance, in the direction of rotation, of the compression cylinder which discharged such charge into the firing chamber 49. The piston 39 in this power cylinder is at this time just past its upper dead center, and is starting on its downward stroke. The force of the exploding charge acts on this piston and forces it downward, preferably for substantially the full length of its down stroke. The expansion action of the burning gases on the successive power pistons produces the rotation of the rotor and the shaft 32. As each power piston reaches the end of its down stroke, the passage 40 at the upper end of the associated power cylinder 14 comes into registry with the arc-shaped passage 43, and remains in registry therewith through substantially the entire up-stroke of the power piston, so that the burned gases from the exploded charge may be expelled from the power cylinder into the exhaust pipe 46 during the up-stroke of the power piston.

This cycle is repeated for the successive cylinders. Each compression cylinder draws in a charge of explosive mixture as its piston moves downward, and compresses such charge and finally forces it into the firing chamber 49 as its piston moves upward. Each power cylinder receives from the firing chamber a burning charge of explosive mixture as the piston in such cylinder starts its down-stroke, and the force of the explosion of such burning charge forces such power piston downward; and during its up-stroke each power piston forces out the burned gases through the exhaust pipe 46. All the ignition occurs in the firing chamber 49. By having the power cylinders of greater displacement than the compression cylinders, and by letting the power stroke continue to substantially the end of the down stroke of the power pistons, the expansion of the burning gases is in larger measure made effective. The power strokes of the power pistons give sufficient power to produce the actions which have been described, and to drive the associated apparatus, which may be an automobile or anything else. The rotation of the rotor produces a sufficient movement of air around the cylinders to give effective cooling.

I claim as my invention:

1. An internal combustion engine, comprising an annular series of power cylinders and an annular series of compression cylinders with the power cylinders and the compression cylinders arranged alternately, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage.

2. An internal combustion engine, comprising an annular series of power cylinders and an annular series of compression cylinders, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage.

3. An internal combustion engine, comprising an annular series of power cylinders and an annular series of compression cylinders with the power cylinders and the compression cylinders arranged alternately, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage, said registry with said intake and exhaust passages continuing for the larger part of a piston stroke of the associated piston, and said registry with said firing chamber continuing for but a portion of a piston stroke while the associated piston is near a dead center.

4. An internal combustion engine, comprising an annular series of power cylinders and an annular series of compression cylinders, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage, said registry with said intake and exhaust passages continuing for the larger part of a piston stroke of the associated piston, and said registry with said firing chamber continuing for but a portion of a piston stroke while the associated piston is near a dead center.

5. An internal combustion engine, comprising an annular series of power cylinders and an annular series of compression cylinders with the power cylinders and the compression cylinders arranged alternately, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage, said registry with said intake and exhaust passages continuing for greater angular movements of said rotor than does said registry with said firing chamber.

6. An internal combustion engine, comprising an annular series of power cylinders and an annular series of compression cylinders, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage, said registry with said intake and exhaust passages continuing for greater angular movements of said rotor than does said registry with said firing chamber.

7. An internal combustion engine, comprising a rotor and a transmission shaft arranged at an angle to one another, gearing between said rotor and said transmission shaft, said rotor comprising an annular series of alternating power and compression cylinders each oblique to the axis of the rotor, pistons in said cylinders, connecting rods between said pistons and eccentric points on said transmission shaft, and a stator having a firing chamber and intake and exhaust passages, said power cylinders having ports by which each such cylinder communicates alternately with said firing chamber and said exhaust passage, and said compression cylinders having ports by which each such cylinder communicates alternately with said intake passage and said firing chamber.

8. An internal combustion engine, comprising a rotor and a transmission shaft arranged at an angle to one another, gearing between said rotor and said transmission shaft, said rotor comprising an annular series of alternating power and compression cylinders, pistons in said cylinders, connecting rods between said pistons and eccentric points on said transmission shaft, and a stator having a firing chamber and intake and exhaust passages, said power cylinders having ports by which each such cylinder communicates alternately with said firing chamber and said exhaust passage, and said compression cylinders having ports by which each such cylinder communicates alternately with said intake passage and said firing chamber.

9. An internal combustion engine, comprising a rotor and a transmission shaft arranged at an angle to one another, gearing between said rotor and said transmission shaft, said rotor comprising an annular series of alternating power and compression cylinders, pistons in said cylinders, connecting rods between said pistons and eccentric points on said transmission shaft, and a stator having a firing chamber and intake and exhaust passages, said power cylinders having ports by which each such cylinder communicates alternately with said firing chamber and said exhaust passage, and said compression cylinders having ports by which each such cylinder communicates alternately with said intake passage and said firing chamber, said cylinders having external heat-radiating ribs and being exposed to the air so that by the rotation of the rotor a current of air between said ribs is produced.

10. An internal combustion engine, comprising a rotor and a transmission shaft arranged at an angle to one another, gearing between said rotor and said transmission shaft, said rotor comprising an annular series of alternating power and compression cylinders, pistons in said cylinders, connecting rods between said pistons and eccentric points on said transmission shaft, and a stator having a firing chamber and intake and exhaust passages, said power cylinders having ports by which each such cylinder communicates alternately with said firing chamber and said exhaust passage, and said compression cylinders having ports by which each such cylinder communicates alternately with said intake passage and said firing chamber, said stator having a central stem projecting axially of the rotor within said annular series of cylinders, and said stem being hollow and longitudinally slotted so as to permit outflow of air therefrom into the spaces between cylinders.

11. An internal combustion engine, comprising a rotor and a transmission shaft arranged at an angle to one another, gearing between said rotor and said transmission shaft, said rotor comprising an annular series of alternating power and compression cylinders, pistons in said cylinders, connecting rods between said pistons and eccentric points on said transmission shaft, and a stator having a firing chamber and intake and exhaust passages, said power cylinders having ports by which each such cylinder communicates alternately with said firing chamber and said exhaust passage, and said compression cylinders having ports by which each such cylinder communicates alternately with said intake passage and said firing chamber, said power cylinders having greater displacement than have said compression cylinders.

12. An internal combustion engine, comprising an annular series of power cylinders and an annular series of compression cylinders, all said cylinders forming part of a unitary rotor, pistons associated with the respective cylinders and reciprocable therein upon the rotation of said rotor, a stator having a firing chamber and intake and exhaust passages, said compression cylinders having ports by which during rotation of the rotor each such cylinder communicates alternately with said intake passage and with said firing chamber, and said power cylinders having ports by which during rotation of the rotor each such cylinder communicates alternately with said firing chamber and with said exhaust passage, said power cylinders having greater displacement than have said compression cylinders.

13. An internal combustion engine, comprising a plurality of power cylinders, a plurality of compression cylinders, said power cylinders having greater displacement than have said compression cylinders, valveless pistons associated with said cylinders, a common firing chamber into which all said compression cylinders discharge and from which all said power cylinders receive their charges, each compression cylinder having a port by which it both receives and discharges charges of explosive mixture and discharges to the firing chamber, and each power cylinder having a port by which it both receives and discharges from the firing chamber and discharges to the atmosphere entirely separately from said firing chamber.

14. An internal combustion engine, comprising a plurality of power cylinders, a plurality of compression cylinders, valveless pistons associated with said cylinders, a common firing chamber into which all said compression cylinders discharge and from which all said power cylinders receive their charges, each compression cylinder having a port by which it both receives charges of explosive mixture and discharges to the firing chamber, and each power cylinder having a port by which it both receives charges from the firing chamber and discharges to the atmosphere entirely separately from said firing chamber.

In witness whereof, I have hereunto set my hand at Indianapolis, Indiana, this 7th day of June, A. D. one thousand nine hundred and eighteen.

EDWIN B. GALBREATH.